July 7, 1931.  J. F. SEITZ  1,813,428
METHOD AND MEANS FOR MAKING DISSOLVES AND EFFECTS IN MOTION PICTURES
Filed Dec. 20, 1926  2 Sheets-Sheet 1
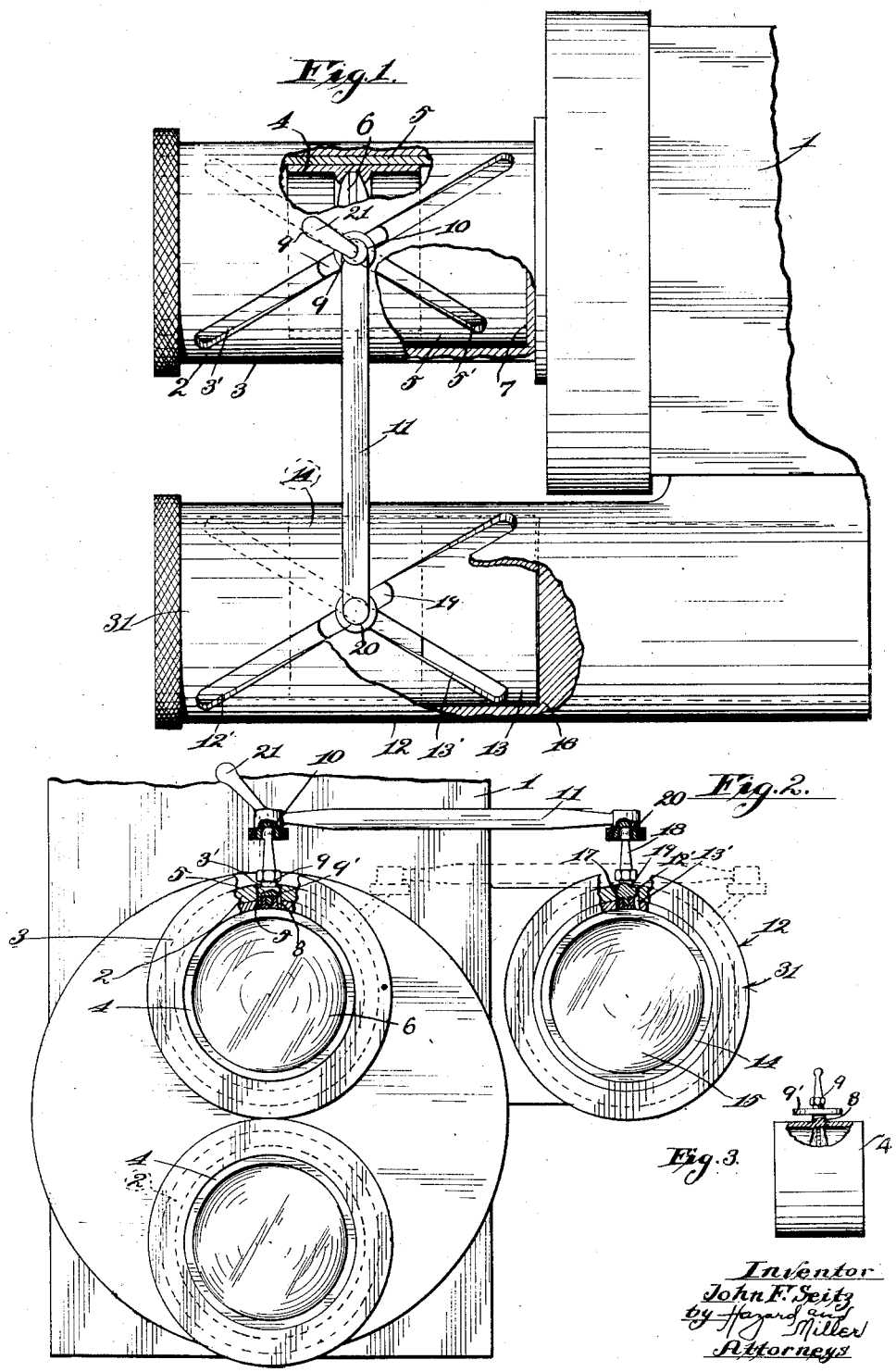

July 7, 1931.     J. F. SEITZ     1,813,428
METHOD AND MEANS FOR MAKING DISSOLVES AND EFFECTS IN MOTION PICTURES Filed Dec. 20, 1926     2 Sheets-Sheet 2

Inventor
John F. Seitz.
by Hazard and Miller
Attorneys

Patented July 7, 1931

1,813,428

UNITED STATES PATENT OFFICE

JOHN F. SEITZ, OF LOS ANGELES, CALIFORNIA

METHOD AND MEANS FOR MAKING DISSOLVES AND EFFECTS IN MOTION PICTURES

Application filed December 20, 1926. Serial No. 155,915.

My invention relates to motion pictures and particularly to the production of certain symbols and effects to be used in the motion picture art and the means to produce these effects.

In the motion picture certain symbols are employed to express a desired idea in the screen story, for example, the fade-out (a gradual darkening of the scene until the screen becomes entirely dark) denotes a lapse of time in the story, the conclusion of a sequence of scenes, the conclusion of the story and the like, the fade-out is to the motion picture what the period is to the art of writing; its meaning is well understood by all patrons of the motion-pictures.

Other symbols, such as the lap-dissolve, the double-exposed vision, etc. express ideas that are easily understood by all motion picture audiences.

My invention has for its object the production of new symbols for the screen and the apparatus therefor. For this purpose I construct a new type of mounting for a cinematographic lens, whereby the rays of light emanating from a scene can either be focused sharply on the film or can be thrown so far off the focal point as to reduce lines and masses of the scene to a formless blur.

The transition from the point of sharpness to the point of absolute blur can be accomplished with this new mounting with great rapidity, or if desired can be made slowly and gradually, for this purpose adequate means are provided for moving the lens conveniently and instantly from its focal center to a distance where the scene becomes a total blur or to any point intermediate between these two positions.

The intermediary stages between sharp focus and complete blur are easily controlled by my new type of lens mounting, thereby opening a vast field for the production of strange, vague forms and effects hitherto not considered or explored, enlarging the expressive power of the motion picture camera. The myriad forms springing out of nothingness quickly gathered and formed by this lens into the realities of the scene, give a new and pleasant sensation to the spectators.

This invention enabling the photographer to instantly move the lens from its point of focus to a position where no form or image remains on the film, will facilitate the transition from scene to scene without shock or jar of any kind, extending the pictorial scope of the motion picture camera which has heretofore been hampered through being forced to work within one shape or proportion. For example in photographing a forest of tall trees, it is generally desirable to mask in the sides to secure a finely composed picture and give the effect of height, or in a scene of a broad plain, the picture would give a better effect of breadth and flatness if the top and bottom were masked in. With existing methods in motion pictures, the proportions of the screen cannot be changed without an unpleasant jar to the audience. Through this invention, the shape or proportions of the scenes can be changed as desired and introduced into the picture without a shock of any kind, that is, by dissolving one scene out of focus and dissolving the succeeding scene into focus at the desired speed, the change from one scene to another even if the proportions of the scenes are different, can be accomplished smoothly, pleasantly, without shock of any kind.

Another use of this invention consists in employing it in the motion picture story as a symbol of transition, from one place or state of mind to another.

A further and very important use of this method and apparatus, consists in employing it either alone or in conjunction with an apparatus for moving objects in front of the lens in any manner or speed desired, to secure weird, fantastic forms, moving, changing, representing various mental states, the creations of a disordered mind, the vague moving forms evoked by music, forms and designs ever moving, ever changing, beautiful or ugly, rhythmic and harmonious or discordant and disordered, moving slowly or quickly as desired.

Another object of my invention is in making dissolve type of pictures or the like by a projection printing method, in which case a series of pictures are projected by a projector on a screen, and while these are being projected, the focus of the projecting lens is altered so that the picture as illustrated on the screen may be changed from a clear to an indistinct focus, or vice versa. Operating in synchronism with the projector I utilize a camera which photographs the scene as projected and therefore the camera photographs the dissolves as projected on the screen. If it is desired to bring another picture into the scene, the projector and camera may be stopped and a new film run through the projector, this having a transition from, say, a blurred or indistinct focus to a distinct focus, or vice versa, and the camera taking this picture in synchronism with the projection.

In the accompanying drawings, which illustrate the mounting of a lens on a cinematographic camera whereby moving picture films producing the effects hereinbefore mentioned are produced;

Figure 1 is a plan view showing a portion of the moving picture camera and the photographing lens and finder lens housings to which my invention is applied, with parts broken away to show the internal construction;

Fig. 2 is a front elevation thereof;

Fig. 3 is a detailed view showing the attachment of the arm to the inner lens housing.

Figure 4:
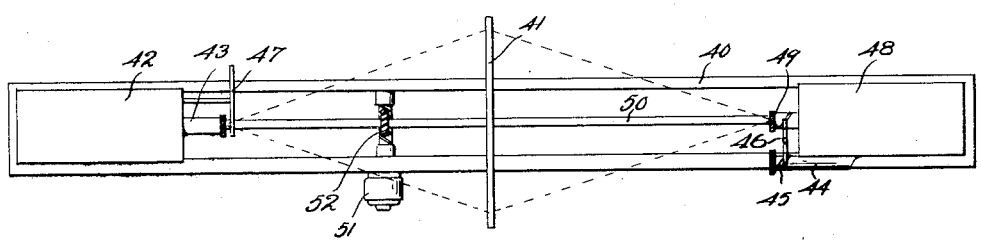
Fig. 4 is a diagrammatic plan of a projector camera printer using my dissolve type of lenses.

Referring to the drawings, 1 indicates a motion picture camera of any preferred construction having in front thereof photographing or taking lens housings 2—2. I have only shown two of them, tho there are usually four taking lens housings with lenses therein, any one of which may be used successively in taking pictures. 31 is a finder lens housing.

The lens housing 2 consists of an outer stationary casing 3 and inner casing 4 arranged for longitudinal and rotational movement and a rotatable casing 5 intermediate the outer casing 3 and the inner casing 4. 6 is the lens rigidly mounted in the inner casing 4. The rotatable casing 5 abuts at its inner end against an annular shoulder 7 of the camera 1 allowing the intermediate casing 5 to rotate but not to move longitudinally. The outer stationary casing 3 is provided with a longitudinal slot 3' which is preferably helical. The intermediate casing 5 is provided with a similar slot 5' but arranged transversely to the slot 3'. Rigidly secured to the inner casing 4 is an internally threaded nipple 8 arranged to project through both the slots 5' and 3' for the reception of a detachable arm 9 threaded therein. In order to provide a greater bearing surface arm 9 is provided with bearing members 9' extending in opposite directions therefrom and disposed in the slot 3' only, engaging the side walls of slot 3' formed in the outer stationary casing 3. The upper end of arm 9 connects with a universal joint 10 to operating link 11. The other end of operating link 11 is operatively connected with the finder lens disposed in the finder lens housing 31, which, in all respects, is constructed like the taking lens assembly. There is an outer stationary casing 12, having a helical slot 12', and an intermediate rotatable casing 13 having a helical slot 13' arranged transversely to helical slot 12'. 14 is the inner longitudinally slidable casing, in which finder lens 15 is mounted. 16 is the shoulder on outer casing 12 preventing longitudinal movement of rotary casing 13. 17 is the nipple in which arm 18 is detachably secured, with bearing blocks 19 engaging the sides of slot 12' only. A universal joint 20 connects arm 18 to operating link 11. A handle 21 on link 11 adjacent the taking lens housing 2 moves the link and the taking lens 6 and finder lens 15 simultaneously and the same distance.

The casings of the lenses are light-proof or light-tight in that the slots 3' and 5' in the outer and inner casing, respectively, cross over each other and are not in alignment, and at the position of the cross-over there is the nipple 17 and the bearing blocks 19, as well as the bearing members 9'. These various elements exclude the light from entering the camera at the lens where the slots cross over each other.

The operation of the device is obvious. Assuming that both the taking lens 6 and the finder lens 15 have the same focal length, the lenses are simultaneously moved into and out of focus to any distance desired. The operator by means of his finder lens knows at all times the condition of the scenes photographed.

While it is preferred to have the finder lens operatively connected to the taking lens as described, my invention is also applicable to the taking lens alone, in which case, of course, the link 11 and the universal joint 10 is omitted, and the handle 21 is secured directly to arm 9 of the taking lens.

My invention is also applicable to projection printers by means of which pictures are thrown on a screen and which also contains another lens to receive the projected scene and focus the same on a positive. The projecting lens of the printer is arranged with means as described for quickly changing the projecting lens out of focus to any distance desired so as to produce either a clear focus picture or a total blur on the screen or any picture intermediate between the two under the perfect control of the operator.

In Fig. 4 I illustrate a projection printer having a bed or table 40 on which is mounted a screen 41. A projector 42 is placed on one side of the screen and shiftable longitudinally on the table, this projector having a projecting lens 43 connected thereto. The camera has a lens 49 and a finder 44, each having slots 45, with a connecting link 46 to operate the lens and the finder in unison. 47 designates the ordinary shutter for the projector. While the picture projected and its advantages may be readily viewed on the screen, it is sometimes desirable in photographing this to depart from the picture as projected, and hence it is desirable in a camera in such cases to utilize the finder, shifting in synchronism with the lens. A longitudinal shaft 50 connects the projector and camera and is driven by an electric motor 51 through a suitable gear train 52, this operating the projector and camera in synchronism.

From this construction it will be apparent that as the pictures being projected by the projector change in aspect, that is, by shifting from a distinct to a blurred image, the pictures photographed also have the same characteristics.

Figure 5:
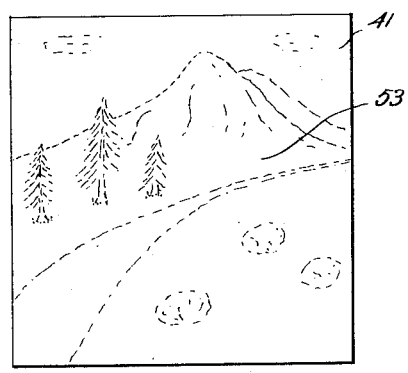
Fig. 5 illustrates a view being projected on the screen.
Figure 6A:
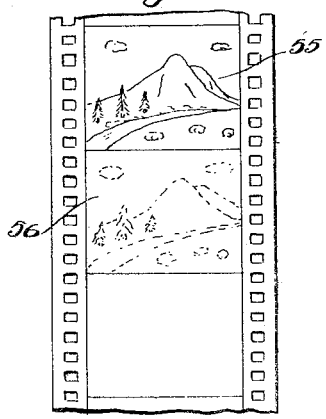
Fig. 6 and Fig. 6A show sections or different frames of the film taken by the camera, showing the effect produced by dissolves, such dissolves being made by causing a blurring or shifting out of focus of the picture of Fig. 5 as it is projected.
Figure 6:
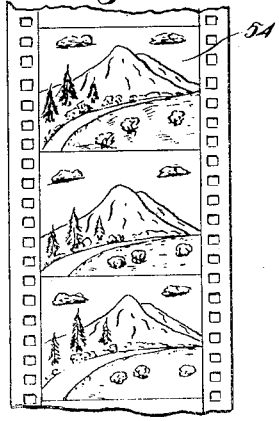

This type of picture is illustrated in Figs. 5, 6 and 6A. In Fig. 5 the screen 41 has the scene designated generally by the numeral 53 projected thereon, and by means of simultaneously changing the focus of the projector lens 43 and the finder 44, this picture is gradually blurred. Therefore, the camera in taking the picture shows certain frames 54 having clear images photographed thereon. These gradually change to a more indistinct image 55, then to a blurred image 56; thus effecting a dissolve.

In order to effect a transition of another picture, the projector and camera may be stopped and a new film run through the projector. This may start with a blur and gradually change into a distinct and clear focus, the photographed picture having the same effect.

In the appended claims the term motion picture apparatus is intended to cover both the motion picture camera as well as the projection printer.

Various changes may be made in the construction of the lens mounting by those skilled in the art, without departing from the spirit of my invention as claimed.

I claim:

1. A method of making dissolves in motion pictures which comprises moving the lens of a motion picture apparatus quickly out of focus while making a series of exposures of a scene so that the scene becomes blurred to any desired degree, then bringing a second scene into focus from a blur.

2. A motion picture device comprising a stationary outer lens casing having a longitudinal slot and a rotatable and longitudinally slidable inner lens casing, a lens mounted therein, a rotatable casing having a longitudinal slot arranged transversely from the first mentioned slot, said rotatable casing being intermediate the outer and inner lens casings, an arm rigid to the inner lens casing and projecting through both of said slots and means for manually operating said arm whereby the inner lens casing is moved longitudinally and the intermediate casing is rotated simultaneously.

3. A motion picture device comprising a stationary outer lens casing having a longitudinal slot, an inner rotatable and slidable lens casing, a lens mounted therein, an arm rigid to the inner lens casing and projecting through said slot, manual means for moving the inner lens casing longitudinally and means intermediate the outer casing and the inner lens casing for preventing light from entering the outer lens casing when the inner lens casing is moved longitudinally.

4. A motion picture device comprising a stationary outer casing having a helical slot, an inner rotatable and slidable lens casing, a lens mounted therein, a rotatable casing having a helical slot arranged transversely to the first mentioned slot, said rotatable casing being intermediate the outer and inner lens casing, a finder lens casing mounted for longitudinal and rotational movement, a finder lens therein, an operating link having universal joint connections with both the said inner lens casing and said finder lens casing and manually operated means for operating said link.

5. The method of making dissolves in motion pictures comprising simultaneously and in synchronism moving the lens of a motion picture apparatus and finder, operating such apparatus so that a scene is blurred to any desired extent and another scene brought into focus from a blur and watching the effect through the finder.

6. The method of making motion pictures comprising projecting a series of pictures through a projecting lens on a screen and changing the focus of the lens to change the aspect of such pictures from clear to indistinct focus or vice versa, and at the same time taking photographs of such projected pictures.

7. The method of making motion pictures, as claimed in claim 12, stopping the projecting and photographing, and projecting and photographing a second series of pictures of opposite effects, as from an indistinct focus to a clear focus or vice versa.

8. A motion picture apparatus comprising a projector having a lens, means to project pictures and means to move the lens to change the aspect of the pictures from a clear to an indistinct focus or vice versa, a camera, and means to operate the camera in synchronism with the projector as to exposures.

9. A motion picture apparatus comprising a projector having a lens and a finder, means to project pictures on a screen, means to move the lens and finder to change the aspect of the projected pictures from clear to indistinct focus or vice versa, a camera, and means to operate the camera in synchronism with the projector as to exposures.

10. In a device of the class described, an outer stationary casing, an inner rotatable and slidable casing having a lens mounted therein, an intermediate rotatable casing, the outer casing and the intermediate casing having slots crossing at an angle, a shifting means extending through the said slots and engaging the inner casing and adapted to move said casing in a rotational manner and thereby cause the sliding movement of the inner casing.

11. In a device of the class described, an outer stationary casing having a diagonal slot, an intermediate rotatable casing having a slot in a reverse diagonal position to the slot in the outer casing, an inner rotatable and slidable casing having a lens, a nipple secured to the inner casing and having an arm connected thereto extending through the said slots, a light excluding device in the said slots, the rotational movement of the said arm conveying a rotational movement to the inner casing and also a longitudinal slidable movement to change the focus of the lens.

12. A double lens construction comprising in combination a pair of stationary outer casings, each having a diagonal slot, a pair of intermediate rotatable casings having slots crossing the slot in the outer casing, an inner rotatable and slidable casing in each of the intermediate casings and each having a lens, a nipple and an arm connected to the inner casings and extending through the said slots, and a connecting link between said arms whereby the arms may be given a simultaneous rotational movement and thereby shift the inner casings and the lenses simultaneously in the same direction.

13. A device of the character described, comprising in combination a camera structure having a photographing and a finder lens, each lens being mounted in an inner rotatable and slidable casing, there being an intermediate rotatable casing outside of the inner casing, and a stationary outer casing, the outer casings and the intermediate casings each having diagonal slots intersecting, a nipple connected to each of the inner casings and having an arm extending outwardly through the said slots and a link connecting said arms, whereby the lenses may undergo simultaneous movement of rotation and sliding in the outer casing to simultaneously change the focus of the photographing in the finder lens.

14. In the method of making dissolves in motion pictures, comprising moving the lens of a motion picture apparatus out of focus at a desired speed, while exposures of the scene are made, whereby the scene is blurred to the desired degree but still distinguishable and then bringing a second scene blurred and slightly indistinguishable into a clear focus.

15. In the method of making dissolves in motion pictures, comprising changing the focus of a motion picture apparatus to the desired degree at the desired speed, whereby in a series of exposures of a scene such exposures become blurred to a desired degree and at the same time watching the effect of such blurring and controlling the blurring in accordance with the visible indications thereof.

16. In the method of making dissolves in motion pictures, comprising making a series of exposures of a scene and causing such exposures to gradually become blurred to any desired degree and at the same time watching the effect of such blurring and controlling the blurring in accordance with the visible indications and subsequently making a series of exposures of a second scene and such exposures being first blurred and gradually becoming distinct and in regard to such second exposures, watching the change from the blurred to the distinct image and regulating such change in accordance with the visible indications.

17. In the method of making dissolves in motion pictures, comprising projecting a series of pictures of a scene and gradually changing the projected image from a clear to a blurred image of any desired degree at any desired rate of speed and in synchronism therewith photographing the said image and observing the change from a clear to a blurred image or vice versa and regulating the photographing in accordance with such observation.

18. In the method of making dissolves in motion pictures, projecting a first scene and changing the image from a clear image to indistinct and blurred image of any desired degree at any desired rate of speed, or vice versa, and subsequently thereto projecting another scene commencing with a blurred image and translating to a distinct image at any desired rate of speed or vice versa, and photographing the first projected scene and the second projected scene and observing the changes in the blurring and controlling the photographing in accordance therewith.

19. In the method of making dissolves in motion pictures, projecting a scene with an image of substantially constant clearness, photographing such image and at the same time changing the focus in photographing to cause a change from a blurred to a distinct image or vice versa and at the same time observing such change and controlling the photographing in accordance with such observation.

20. In the method of making dissolves for motion pictures, comprising projecting a first scene with an image of the desired degree of clearness and later projecting another scene of the desired degree of clearness, photographing the first scene and changing the focus whereby such first scene is changed from a distinct to an indistinct image or vice versa, photographing in a camera the second scene and changing from an indistinct to a distinct image or vice versa, and simultaneously with the photographing, observing an image, changing the degree of blurring in synchronism with the changes in the camera and controlling the changes in the camera in accordance with such observation.

21. In the method of making dissolves in motion pictures, comprising utilizing a photographic and a finder lens, changing the focus of the photographic lens to cause a gradual change of the image from a clear to a blurred effect or vice versa and at the same time in synchronism therewith changing the focus of the finder lens and observing the image in the finder and controlling the photographic lens in accordance with the image observed through the finder lens.

22. In the method of making dissolves in motion pictures, comprising utilizing a photographic and a finder lens, changing the focus of the photographic lens to cause a gradual change of the image from a clear to a blurred effect or vice versa and at the same time in synchronism therewith changing the focus of the finder lens and observing the image in the finder and controlling the photographic lens in accordance with the image observed through the finder lens, protographing a second scene, changing the focus of the photographic lens to give an image having a blurred effect to a distinct effect and at the same time and in synchronism therewith, observing an image through the finder lens and controlling the operation of the photographic lens in accordance with the image observed through the finder lens.

In testimony whereof I have signed my name to this specification.

JOHN F. SEITZ.